United States Patent [19]
Beavon

[11] 3,909,484
[45] Sept. 30, 1975

[54] FLAME RETARDANT REINFORCED BONDED ARTICLES AND BONDING COMPOSITIONS THEREFOR

[75] Inventor: Alfred N. Beavon, New Castle, Pa.

[73] Assignee: Universal-Rundle Corporation, New Castle, Pa.

[22] Filed: Apr. 16, 1973

[21] Appl. No.: 351,158

[52] U.S. Cl............ 260/40 R; 260/45.7 P; 260/865
[51] Int. Cl.² ......................................... C08L 67/06
[58] Field of Search ............ 260/865, 45.7 P, 40 R; 106/15 FP

[56] References Cited
UNITED STATES PATENTS

| | | | |
|---|---|---|---|
| 3,202,567 | 8/1965 | Muri et al. | 161/162 |
| 3,560,523 | 2/1971 | Ashton | 117/123 |
| 3,582,388 | 6/1971 | Stayner | 117/27 |
| 3,639,298 | 2/1972 | Lister et al. | 260/2.5 FP |
| 3,671,487 | 6/1972 | Abolins | 260/40 R |
| 3,741,929 | 6/1973 | Burton | 260/40 R |
| 3,810,851 | 5/1974 | Norman et al. | 260/2.5 AJ |

OTHER PUBLICATIONS

*Plastics Technology,* 18(3), 28, (1972).

Bjorksten, "Polyesters and Their Applications," Reinhold, 1956, p. 11.

*Primary Examiner*—Harold D. Anderson
*Assistant Examiner*—E. A. Nielsen
*Attorney, Agent, or Firm*—Arnstein, Gluck, Weitzenfeld & Minow

[57] ABSTRACT

Flame retardant resin bonded articles are provided which contain normally flammable or combustible polyester resin included in a bonding composition which is highly filled with aluminum hydrate and at least about 3 per cent of a trialkyl phosphate. The bonding composition is utilized to bond spatially distributed reinforcing structures, particularly glass fibers, and can include finely divided inert siliceous particles. The bonding composition, although containing a normally flammable or combustible polyester resin, liberates non-burning products under combustion conditions. A method of reinforcing and flame retarding a panel is provided which includes applying to the surface of the panel a layer of spatially distributed reinforcing structures and the bonding composition described above.

6 Claims, No Drawings

3,909,484

FLAME RETARDANT REINFORCED BONDED ARTICLES AND BONDING COMPOSITIONS THEREFOR

BACKGROUND OF THE INVENTION

This invention relates to reinforced bonded filled resin structures and to bonding compositions therefor. More particularly, it pertains to a flame retardant bonding composition comprising a normally flammable polyester resin, aluminum hydrate and a small amount of a trialkyl phosphate.

Polyester resins have been available for a number of years, but only recently have they been widely accepted for use as the essential ingredient in bonding compositions for glass fiber structures. At the present time, injection moldable compositions of glas fibers and polyester resins are being used. Molded articles of these compositions are very useful due to their rigidity, yield strength, modulus and impact strength. Until recently, the application of glass fiber reinforced thermoplastic polyester resins in molded products was severely hindered as they burn readily with the release of copious amounts of smoke and have been found to be extremely difficult to render fire retardant. One method of providing flame retradance to glass fiber and polyester resin compositions is to combine a special resin, namely polytetrafluoroethylene resin, with the polyester. However, addition of a second resin to the composition is undesirable, particularly in bonding compositions which include glass fiber filled or unfilled polyester resins which are to be sprayed onto a surface.

At the present time a large variety of articles are manufactured by spraying a mixture of glass fibers and a bonding composition onto a surface to be coated, such as a pressed fiber board, plaster board, sheets of plastic such as acrylonitrile-butadiene-styrene (ABS) resins, acrylic resins, and the like. Thereafter, the bonding composition is cured, for example, by the application of heat, or more commonly by incorporating into the bonding composition a catalyst for the polyester resin, and permitting the catalyst to effect the curing over a period of time at ambient or slightly elevated temperature. In this manner, a large variety of articles, such as bathtubs, shower stalls, lavatories, sinks, boats, mobile homes, trailers, structural members, canopies, vehicle bodies, furniture panels, and the like, are economically produced. Although these reinforced polyester resin compositions have been widely used, their acceptance has been seriously limited due to the well-known flammability, or at best, high burning rate of the polyester resin.

Thus, there is an existing need for a polyester resin bonding system, particularly for glass fiber reinforcing structures, which is flame retardant, non-burning and, preferably, self-extinguishing. Although flame retardant additives have been proposed for use in other resin systems, including polyester resin systems for bulk molding and sheet molding, these additives are not satisfactory for use in a spray system.

SUMMARY OF THE INVENTION

Therefore, it is one object of the present invention to provide a sprayable polyester resin bonding composition.

It is another object of the present invention to provide a sprayable polyester resin bonding composition which, upon curing, liberates non-burning products under combustion conditions.

It is another object of the present invention to provide a sprayable polyester resin bonding composition, adapted for bonding reinforcing structures, such as glass fiber pieces and particles, which is flame-and smoke-retardant.

Another object of the present invention is to provide a flame retardant bonded article which includes a normally combustible polyester resin.

Still another object of this invention is to provide methods for reinforcing and flame retarding structures, including relatively thin combustible planes, with bonding composition mixtures which include a normally combustible polyester resin.

These and other objects and advantages of the present invention will become apparent from the following description.

In accordance with the present invention a flame retardant filled curable polyester resin bonding composition is provided which after curing liberates non-burning products under combustion conditions. Polyester resin is usually employed as a mixture with a polymerizable monomer and other additives, promoters, etc. as hereinafter described, which will, for convenience be termed "polyester resin mixture". The bonding composition comprises a normally combustible condensation product polyester resin mixture, aluminum hydrate, and a minor amount of a trialkyl phosphate. The objects and advantages of the present invention are obtained when the polyester resin mixture comprises from about 40 to about 60 percent by weight of the bonding composition, the aluminum hydrate comprises from about 40 to about 50 percent by weight of the bonding composition, and the trialkyl phosphate comprises at least about 3 percent by weight of the bonding composition. The trialkyl phosphate preferably has alkyl groups selected from the group consisting of unsubstituted and halogen substituted alkyl groups, for example, ethyl, chloroethyl or bromoethyl groups, and more preferably, unsubstituted alkyl groups having from 2 to 5 carbon atoms. The most preferred trialkyl phosphate for use in the present invention is triethyl phosphate.

It has now been found that the above-described components in the stated proportion provide a sprayable polyester resin bonding composition which has unexpected desirable flame retardance smoke retardance and flame spread characteristics. These bonding compositions are particularly useful for bonding reinforcing structures, such as glass fibers. The glass fibers can be in the form of a layer, or can be in other form. In one particularly useful form of the invention, the reinforcing structures can comprise filamentous glass chopped and mixed with the bonding compositions itself and together sprayed onto a surface to form the desired layer in situ subsequent to their being mixed.

In still another form of the invention, filamentous glass and the bonding composition can be sprayed together from adjacent, but separate nozzles onto a surface with the layer of filamentous glass reinforcing structures again being formed in situ. The surface to which the layer of reinforcing structures and bonding compositions is applied is advantageously a surface of a panel or structure adapted to be laminated. Panels and structures of various materials having a surface adapted to be laminated, such as plaster board, particle board, fiber board, and the like, can be fabricated, either prior to or subsequent to the application of the reinforcing structures and bonding composition thereto.

The present invention also provides methods for reinforcing and flame retarding thin combustible panels, such as plastic sheets. One method provided comprises applying to the surface of the panel adapted to be laminated, a composition which includes a plurality of spatially distributed reinforcing structures, the flame retardant bonding composition of this invention and a catalyst for the bonding composition in a minor amount, and catalytically curing the bonding composition subsequent to its application to the panel. The term "surface adapted to be laminated" is understood to be generally applied to surfaces which have been or can be used in the presently practiced spraying procedure for laying up glass fibers and resins. As heretofore described, such surfaces include the exposed surface of panels of fiberboard, plasterboard, particleboard, plastic sheets, such as acrylic and ABS resin sheets, and the like. It is contemplated that the surface to be reinforced and treated may require pretreatment, such as washing, roughing, or etching so as to be "adapted to laminated" as defined herein. The bonding composition can include one or more organic solvents to facilitate spraying of the composition, and can be modified to tolerate higher moisture content, to promote rapid curing and to selectively adjust wetting and flow characteristics as desired. In another method a cured layer of the bonding material may be adhesively laminated to the surface of the panel. The solvent heretofore described may assist in adapting the surface of the panel or structure to be treated, for example, by rendering the surface into a tacky condition to facilitate bonding. The article produced by these methods comprises a flame and smoke retardant, reinforced layer laminated to the surface of a panel or other structure, which not only has rendered the surface flame retardant, but has improved the physical properties and finish quality of the surface. As a result, thinner supporting structures can be utilized due to the strength added to the structure by the reinforcing layer. A saving in the cost and weight of the completed article is thus achieved without sacrificing strength and other properties. In addition, the methods of reinforcing and flame and smoke retarding defined herein also contemplate further improving the resulting product by incorporating into the bonding composition finely divided siliceous particles, such as glass fibers, spheres, and the like.

DESCRIPTION OF THE INVENTION

The bonding compositions of the present invention, after curing, liberate non-burning products under combustion conditions, although one of the major ingredients of the compositions is a normally flammable or combustible polyester resin. As used herein, the terms "non-burning", "flammable", "flame retardant", "self-extinguishing" and the like, are used in their general and relative sense, although reference may be had to various ASTM definitions and test methods, particularly D-635, Underwriters Laboratories bulletins, particularly No. 94 and Hooker Lab Test 15 Intermittent Flame Test, "hereinafter referred to as HLT-15." The latter test is particularly applicable in determining the self-extinguishing properties of resinous materials, including glass fiber reinforced laminates. "Combustible" as used herein is understood to mean capable of undergoing combustion, i.e., capable of igniting, burning and sustaining burning with the evolution of heat and light.

The polyester resins utilized in the bonding composition of the present invention are widely known and commercially available, usually as solutions, or at least mixtures of the polyester resin in a polymerizable vinyl monomer, preferably a polymerizable vinyl monomer solvent. Preferred solutions or mixtures of polyester resin in vinyl monomer contain from about 25 to about 60 percent by weight of the latter ingredient. A large number of suitable unsaturated polyester number monomer mixtures are sold as bounding agents for glass fibers. Polyester resins generally are condensation products of unsaturated polybasic acids or anhydrides and polyols. Commonly, the polyester resins are formed from unsaturated anhydrides, dibasic acids, or mixtures thereof, such as maleic acid and anhydride and fumaric acid, and a glycol. Saturated anhydrides and dibasic acids can also be employed, for example, phthalic acid or anhydride, adipic acid or anhydride, azelaic acid or anhydride, sebacic acid or anhydride, and the like. Glycols which are useful in preparing the polyester resins include propylene glycol, ethylene glycol, dipropylene glycol, diethylene glycol, Bisphenol-A and hydrogenated Bisphenol-A adduct, and the like. Particularly useful in this invention, are the higher molecular weight, normally flammable, linear polyesters of terephthalic and isophthalic acids or anhydrides and a glycol such as propylene glycol. As is known, the polyester resins can be prepared by known methods, such as by the alcoholysis of esters of the acids or anhydrides with the glycol and subsequent polymerization; by heating glycols with the acids, and similar processes.

The polyester resins described above form thermosetting masses by utilizing the resin in a solvent, particularly a polymerizable vinyl monomer solvent, and finally curing the mixture with a catatalyst. Aromatic vinyl monomeric solvents, particularly styrene and vinyl tolune, are most frequently utilized as the cross-linking monomer solvent, although other monomers, such as divinyl benzene, alkyl acrylates, alkenyl acetates and the like can also be employed. The catalyst normally utilized is a free radical initiator of the organic type, particularly a peroxide, such as methyl ethyl ketone peroxide, hydrogen peroxide, acetyl benzoyl peroxide, cumene hydroperoxide, benzoyl peroxide, methyl amyl ketone peroxide, lauroyl peroxide, and the like. These initiators are utilized in a small amount, preferably in an amount of from about 0.1 percent to about 5 percent by weight of the polyester resin-solvent mixture. The polyester resin mixtures can contain additional components, such as light stabilizers, e.g. substituted benzophenones, and other additives. Polyester resin, as described above, in polymerizable vinyl solvents are commercially available as is known to those skilled in the art. Preferred polyester resin-monomer solvent mixtures are: 93-524 marketed by Reichold Chemical Company and Resin No. 40-2837 marketed by Freeman Chemical Company of Port Washington, Wisc. U.S.A., the latter containing about 45 percent solvent.

The commercially available polyester resin mixtures which have heretofore been used in bonding compositions for glass fibers, are useful in the compositions and methods of the present invention. The polyester resin mixture can be modified to obtain a lower viscosity for improved wet out, a high thixotropic index for reduced flowability and a higher proportion of promoters to shorten geltime upon curing. The addition of promoters is usually required due to the inhibitors present in commercially available polyester resin and further due to the inhibiting effect of the large proportion of aluminum hydrate in the composition. The promoters, also called accelerators, include cobalt, iron, lead, nickel-octoate, napthenate, and the like. The promoters are utilized to enhance the rapid and uniform curing of the coating. Generally, basic thixotropic additives are utilized with the polyester resin in an amount of approximately 2 percent by weight of the polyester resin.

The bonding compositions of the present invention further include a major amount of aluminum hydrate, also termed hydrated alumina. Although aluminum hydrate has been used in samll amounts with polyester resins as an inorganic filler, it has now been found that major amounts of aluminum hydrate, specifically comprising from about 40 to about 50 percent of the bonding composition are highly beneficial in providing flame retardant, reinforcing bonding compositions of the present invention. Preferably, the bonding composition comprises about 50 percent aluminum hydrate, which amount is greater than the amount by weight of the polyester resin in the composition, for example, from about 105 to about 110 parts by weight aluminum hydrate per hundred parts by weight polyester resin can be preferably utilized. "Parts by weight" hereinafter will be referred to as "pbw" for the sake of brevity.

Aluminum hydrate generally contains on a weight basis, about 65 percent aluminum oxide and about 35 percent water. Commercial grades of aluminum hydrate having average particle sizes of from about 4 to about 10 microns, such as GHA-332 marketed by the Mineral Products Division of Great Lakes Sand and Foundry Co., Detroit, Mich., U.S.A., having an average particle size of about 5 microns, and Hydrated Alumina C-333 marketed by Alcoa Chemical Division of Aluminum Company of America, having an average particle size of about 6.5 to 8.5 microns and a specific gravity of about 2.4, are suitable for use in the bonding composition of the present invention. The hydrate should be finely divided so as to uniformly mix with the polyester resin. Although the benefits of the presence of the major amount of aluminum hydrate in the composition is not completely understood, it is believed that the material increases the specific heat and thermal conductivity of the cured composition, and increases the dissipation or absorption of heat to reduce the heat available for propagation of flame and burning. The presence of the hydrate is believed to increase the heat absorption of the composition as it absorbs energy in dehydration of the water of hydration.

The third essential ingredient of the bonding compositions of the present invention is a trialkyl phosphate, as heretofore described. It has now been found that amounts of phosphate based upon the weight of the preferred phosphate i.e., triethyl phosphate, below about 3 percent by weight of the bonding composition are ineffective to provide the flame retardance provided by the bounding composition of the present invention, whereas amounts of phosphate, again based upon the weight of the preferred phosphate, i.e., triethyl phosphate, above about 3 percent of the weight of the bonding composition adds insignificantly to the flame retardance of the composition. Therefore, the most preferred proportion of the phosphate, based upon the weight of triethyl phosphate, is about 3 percent of the weight of the bonding composition.

While the effect of the trialkyl phosphate in the cured bonding composition is not completely understood, it is believed that the compound redirects the decomposition and combustion reactions toward reduced heat of combustion and causes the burning to result in the formation of carbonaceous char rather than flammable gases, and the reduction of glowing oxidation. The successful use of trialkyl phosphates in the present compositions is surprising, as the use of the preferred phosphate, triethyl phosphate, in the composition, but in the absence of aluminum hydrate, does not provide satisfactory fire retardance. Similarly, the trialkyl phosphate ingredient is required in the compositions of the present invention, as the aluminum hydrate in the absence of the trialkyl phosphate does not provide satisfactory fire retardance to the bonded product.

The present invention provides flame retardant bonded articles which comprise a layer of spatially distributed reinforcing structures reinforced and bonded by the bonding structure herein. As heretofore described, the layer may be prepared prior to the application of the bonding composition, or the layer can be prepared in situ by spraying together or concomitantly with the bonding composition.

The preferred reinforcing structures are glass fibers, also termed filamentous glass, which are well known to those skilled in the art and which are widely commercially available. Fibrous filaments of various types of glass can be utilized dependent upon the ultimate use of the structure and the method by which it is to be prepared. For most purposes, common glass or low soda glass is satisfactory, although where high electrical resistance is required lime-aluminum borosilicate glass which is relatively soda free may be preferrred. Filaments of the glass can be made by standard known procedures, e.g., by steam or air blowing, flame blowing and mechanical pulling.

The diameter and length of the glass fibers to be used will also depend upon its application and the method of preparation of the article. Generally, the diameter and length of the fibers are not critical to this invention, although where the reinforcing structures are sprayed, either mixed with or separately of the bonding composition, the pieces or rovings must be of a sprayable size, i.e. sufficiently small so as to readily pass through the spray nozzles of conventional spray guns presently utilized for spray lay up applications. On the other hand, the fibers may be bundled into yarns or ropes, or may be woven into mats, and therefore require lengths of several inches or more. In the practice of the present invention, woven mats of glass fibers can be supported and sprayed with the bonding composition to form a flame retardant bonded layer or can be placed against a surface and sprayed with the bonding composition described herein to bond the strands of the mat and laminate the mat to the said surface. Preferably, the layer is formed in situ by spraying chopped strands of fine glass fibers concomitantly with the bonding composition as in a chopper spray gun.

The flame retardant bonded articles of the present invention are further improved by incorporating into the bonding composition finely divided siliceous particles. Preferred siliceous particles are glass particles, while the preferred shape of the particles is spherical, although other shapes can be utilized. The particles must be finely divided to facilitate uniformly dispersing the particles in the bonding composition and to permit the particles to pass with the bonding composition through the orifices of the nozzles of conventional spray guns presently used for spray lay up applications. Generally the particle size of the siliceous particles should be less than about 1000 microns in its largest dimension, and preferably should be on the order of about 200 microns. The siliceous particles assist in distributing stress between the reinforcing structures of the layer. These particles can be incorporated into the bonding composition in a minor proportion, for example, in an amount based upon from about 1 to about 20 percent of the weight of the bonding composition.

The bonding composition, of the present invention with or without glass fibers and with or without siliceous particles, as described above, have now been found to be useful to reinforce and flame retard thin combustible panels, such as plastic panels, fiber boards, and the like. These panels generally have surfaces which are adapted to be laminated or can be treated as heretofore described to make them so adapted.

The bonding composition of this invention is particularly useful to reinforce and flame retard acrylic or other thermoplastic sheets. The bonding composition adheres readily to the surfaces of such sheets, with or without adhesives, and reinforces the same to a surprising extent.

One method of the present invention comprises applying to the surface of a structure, such as the thin combustible panel described above, the bonding composition of the present invention and a catalyst therefor in a minor amount, and catalytically curing the bonding composition subsequent to its application to the surface of the structure. The preferred method of applying the bonding composition and catalyst is spraying the same by use of a spray gun as presently utilized for non-flame retardant polyester resin spray lay up applications. The catalyst preferably is of the type and is utilized in the amount heretofore described. The curing step is preferably performed by permitting the catalyst to effect curing after application of the bonding composition-catalyst mixture, particularly where the catalyst was added to the bonding composition immediately prior to the application step. curing can take place at ambient temperatures, but takes place in a shorter time at slightly elevated or higher temperatures.

In a preferred method of using the novel bonding composition of the present invention, the bonding composition including the catalyst therefor in a minor amount is sprayed with reinforcing structures, such as glass particles, e.g. fibers, onto a thin layer. In a preferred embodiment, the latter thin layer can be a cured layer of polyester resin gel coat, particularly where the resultant structure is to be used for sanitary ware. Commercially available, sanitary ware grade polyester resin gel coat is satisfactory for this purpose. The coated layer is then cured, for example, at room temperature for a sufficient time to effect thorough curing as dictated by the amount of promoters and catalyst utilized. In many instances the laminate formed by the gel coat and the reinforced, cured bonding composition is useful per se. However, it is preferred to structurally reinforce the laminate by applying a supporting structure, such as the boards, such as plaster board, or plastic sheets heretofore described, to the laminate by various means, such as adhesvies, cements, and the like. The non-laminated surface of the supporting structures, if used, can be similarly laminated, or simply can be sprayed with the bonding composition, with or without reinforcing structures, and cured to obtain the flame and smoke retardant, reinforced article suitable for use for sanitary ware.

The resultant product is improved by incorporating finely divided siliceous particles into the bonding composition prior to the application step or by concomitantly applying reinforcing structure, such as glass fibers, with the bonding composition-catalyst mixture, or both, as heretofore described.

The resultant bonded article is reinforced and flame and smoke retardant, and comprises a flame and smoke retardant layer of the bonding composition, and preferably, of a plurality of spatially distributed siliceous reinforcing structures bonded to each other and to a supporting surface, such as a panel, by the bonding composition of this invention.

DESCRIPTION OF PREFERRED EMBODIMENTS

The following examples illustrate preferred embodiments of the invention and are set forth as a further description.

EXAMPLE 1

Preparation of a Polyester Resin Mixture

Into a stired, heated reactor is added 0.59 moles of propylene glycol, 0.55 moles of diethylene glycol, 0.45 moles of maleic anhydride and 0.55 moles of isophthalic acid. The contents of the reactor are maintained at about 350° to about 400°F. for several hours until the unsaturated condensation product has an acid number of about 15—20. 20. Fifty-five phw of the product is added to 45 phw styrene to form the desired mixture.

EXAMPLE 2

Preparation and Testing of a Bonding Composition

Ninety-four grams of a polyester resin in styrene (approximately 45 percent styrene) mixture, Freeman Chemical Co. Resin No. 40-2837, having the following properties:

| | |
|---|---|
| Viscosity at 77 degrees F., 6 RPM | below 800 centipoises per second |
| Thixotropic index | 2.5–3.3 |
| specific gravity | approximately 1.08 | was vigorously stirred first with 100 grams of commercial grade aluminum hydrate having an average particle of 6 microns and then with 6 grams of triethyl phosphate until the mixture was substantially homogeneous. The resulting mixture was a bonding composition of the present invention, to which approximately 1 gram of methyl ethyl ketone peroxide catalyst is added prior to application such as by spraying, to effect cross-linking of the active ingredients of the bonding composition.

Samples for flame testing according to HLT-15 were prepared on plate glass panels as follows:

A glass panel was waxed on one surfact with a release wax. A mat of chopped glass fibers in a binder (a standard one-ounce glass fiber mat) measuring approximately 7 inches by 7 inches by one-eighth inch was weighed out and 4 times the weight of the bonding composition prepared above was weighed out and segregated. A small portion of the segregated amount of bonding composition with catalyst was coated onto the waxed surface of the glass panel to form a thin film. The glass fiber mat was placed on the coated glass panel and another portion of the segregated bonding composition was poured over the mat and brushed out evenly over the mat. A second and a third portion of the bonding composition utilizing the remainder of the segregated composition, was poured onto the mat and similarly brushed evenly over the mat. The surface of the mat was rolled with a film casting rod. The coated mat was cured for 24 hours at room temperature. The cured mat was separated from the glass panel and was cut into one-half strips.

The HLT-15 Intermittent Flame Test is particularly useful in determining the self-extinguishing properties of resin mixtures in the form of clear castings and fiberglass reinforced laminates. The test is more severe than the ASTM D-635 flammability test because the specimen is suspended in a vertical position within the flame and the specimen is ignited five times using increasingly longer ignition periods.

Five strips cut from the reinforced, bonded mat were tested by being clamped vertically with the lower end of each strip approximately 1½ inches above a Tirrell Burner held at an angle of 20° from the vertical. The equipment was placed under draft-free conditions. The burner flame was adjusted to a 1½ inner blue cone with a flame height of approximately 5 inches. The flame was repeatedly and periodically applied to each of the 5 strips according to the following schedule:

| Flame On (Ignition Time, Seconds) | Flame Off (Off Time, Seconds) |
| --- | --- |
| 5 | 10 |
| 7 | 14 |
| 10 | 20 |
| 15 | 30 |
| 25 | 50 |

When the flame is withdrawn and the burning does not exceed the off time, the specimen has passed that ignition cycle. A specimen receives a rating of 20 for each cycle passed with a maximum rating of 100 if the specimen passes all five cycles and a minimum rating of zero if burning exceeds the off time of the first cycle, that is, burning exceeds 10 seconds in the first cycle. An average of the ratings for the five specimens is utilized as the reported rating.

The glass fiber mat treated with the bonding composition as described above and constituting 80 percent bonding composition and 20 percent glass fibers was found to have an average HLT-15 rating of 60 and produced a moderate amount of gray smoke during the burning time.

Similar samples of bonding composition of the present invention comprising 47 percent of various polyester resin in styrene mixtures, 50 percent aluminum hydrate and 3 percent triethyl phosphate was tested for flame spread and smoke retardance in accordance with the ASTM E-84 Tunnel Test. Flame spread ratings and smoke density ratings were taken. In this test lower numbers are desirable and, for coparision, untreated polyester resin mixture samples were found to have ratings in the order of 200–300 for flame spread ratings and in the order of 500 for smoke density ratings. The samples described in this paragraph had an average flame spread rating of about 60 and an average smoke density rating of less than 300.

EXAMPLE 3

Preparation of a Reinforced Bonded Article

A panel of plaster board, ¼ inch thick, is coated with a layer comprising of glass fibers and the bonding composition of Example 2 by spraying a mixture of 20 percent glass fibers in the form of rovings and 80 percent bonding composition from a Glas-Craft chopper spray gun. Spraying is continued until a layer of about one-eighth inch is coated on the surface of the board. The coating is allowed to cure at room temperature for about 1 hour. The resulting layer is strongly bonded, durable and has a surface which is flame retardant.

EXAMPLE 4

Preparation of a Flame Retardant Laminated Article

One surface of a panel of an acrylic resin sheet one-sixteenth inch thick, is covered with a mat of glass-fibers which is sprayed with the bonding composition of Example 2 by means of a Glas-Craft chopper spray gun. To obtain a layer having a thickness of at least three thirty-seconds inch after setting at room temperature for about one hour, the opposite side of the panel is sprayed with the bonding composition and glass fibers to obtain a similar coating, which is similarly cured. The resultant laminated article is strong, durable and has flame and smoke retardant surfaces.

EXAMPLE 5

Preparation of a Flame Retardant Sanitary Ware Panel

A sanitary ware article, for example, a lavatory top, and the like formed of glass fibers, plaster board and the bonding composition of the present invention can be made as follows:

A solid temporary backing surface of suitable shape is coated with a release wax to provide a releasable surface. The waxed surface is sprayed with a commercially available sanitary ware grade polyester resin gel coat and cured at room temperature for about one-half hour to obtain a coating of from 0.012 to 0.016 inches in thickness. This coating is then sprayed with a mixture of 20 percent glass fibers in the form of rovings and 80 percent bonding composition as described in Example 2 from a Glas-Craft chopper spray gun to form a layer of at least three thirty-seconds inch in thickness. The reinforced bonded layer is cured at room temperature for at least 30 minutes to one hour. Hot melt adhesive, LHM-993 marketed by Stein, Hall and Co., Argo, Ill., U.S.A., is applied to one surface of nominally ¼ inch plaster board and is pressed, adhesive side down, onto the exposed surface of the bonded, reinforced glass fiber layer. After setting of the adhesive, the opposite exposed surface of the plaster board is sprayed with the glass fiber and bonding composition mixture described above from the Glas-Craft chopper-spray gun to form a layer of about one-sixteenth inch in thickness. The latter layer is cured at room temperature for least 30 minutes to 1 hour. Upon release from the temporary supporting surface, the laminated, reinforced structure is a flame retardant sanitary ware article.

I claim:

1. A flame retardant filled curable polyester resin bonding compostion which after curing liberates non-burning products under combustion conditions, comprising
  a. a mixture comprising a normally combustible condensation product polyester resin and a polymerizable vinyl monomer, said polyester resin being a condensation product of a composition selected from the group consisting of unsaturated polycarboxylic acids and anhydrides, and a polyol, said mixture comprising from about 40 to about 60 percent by weight of the bonding composition;
  b. aluminum hydrate in an amount comprising from about 40 to about 50 percent by weight of the bonding composition; and
  c. a trialkyl phosphate wherein the alkyl groups are selected from the group comprising of unsubstituted and halogen substituted alkyl groups, said trialkyl phosphate comprising at least about 3 percent by weight of the bonding composition.

2. A composition as defined in claim 1 wherein said polyester resin monomer mixture comprises about 47 percent by weight of the bonding composition, said aluminum hydrate comprises about 50 percent by weight of the bonding composition, and said trialkyl phosphate comprises about 3 percent by weight of the bonding composition.

3. A composition as defined in claim 2 wherein the alkyl groups of said trialkyl phosphate are unsubstituted alkyl groups having from 2 to 5 carbon atoms.

4. A composition as defined in claim 2 wherein said trialkyl phosphate is triethyl phosphate.

5. A composition as defined in claim 1 wherein said composition further comprises finely divided inert siliceous particles.

6. The composition as defined in claim 5 wherein said particles are glass particles.

* * * * *

UNITED STATES PATENT OFFICE
CERTIFICATE OF CORRECTION

PATENT NO. : 3,909,484
DATED : September 30, 1975
INVENTOR(S) : ALFRED N. BEAVON It is certified that error appears in the above-identified patent and that said Letters Patent are hereby corrected as shown below:

IN THE SPECIFICATION:

Column 1, line 26, "retradance" should read --retardance--
Column 3, line 57, The quotation marks preceding "self extinguishing" should be inserted
Column 4, line 12, "nember" should read -- number --.
Column 4, lin 12, "number" should read --resin--
Column 4, line 13, "bounding agents" should read --bonding agents--
Column 5, line 17, "samll" should read --small--
Column 7, line 2, "diveded" should read --divided--
Column 7, line 46, "curing" should read --Curing--
Column 8, line 29, "stired" should read --stirred--
Column 8, line 36, The second numeral "20" should be deleted.
Colum 9, line 64, "coparison" should read --comparison--

Signed and Sealed this twenty-fourth Day of February 1976

[SEAL]

Attest:

RUTH C. MASON
Attesting Officer

C. MARSHALL DANN
Commissioner of Patents and Trademarks